United States Patent Office 3,369,391
Patented Feb. 20, 1968

3,369,391
GLASS TRANSITION TEMPERATURE DEPENDENCY ON PRESSURE FOR AMORPHOUS SUBSTANCES
Robert W. Warfield, Germantown, Md., assignor to the United States of America as represented by the Secretary of the Navy
Filed June 7, 1965, Ser. No. 462,148
6 Claims. (Cl. 73—17)

ABSTRACT OF THE DISCLOSURE

A method for determining the glass transition temperature of amorphous materials such as polystyrene by measuring the volume change of the test substances while varying the pressure at constant temperatures.

---

The invention described herein may be manufactured and used by or for the Government of the United States of America for governmental purposes without the payment of any royalties thereon or therefor.

The present invention relates generally to a method for determining the relationship between the glass transition temperature and pressure of amorphous substances and more particularly to a method for determining the glass transition temperature of said amorphous substances at one atmosphere of pressure.

Previous methods of determining the glass transition temperature of amorphous substances include that of subjecting a machined test bar, the glass transition temperature of which is to be measured, to a centered load designed to give a uniform fiber stress of 264 p.s.i. The bar is suspended at each end and immersed in an oil bath, the temperature of which is raised at a rate of 2° C. per minute. When the deflection of the test bar reaches 0.010 inch, the temperature of the oil bath has reached the heat distortion (or glass transition) temperature.

This method of measuring glass transition temperature has the disadvantage that frequently the standard deflection of the test bar occurs over a temperature range rather than at a precise point. Consequently, a carefully machined test bar is required and the temperature of the oil bath is restricted to about 150° C. using test apparatus presently available.

Another method of measuring glass transition temperature consists of determining the electrical volume resistivity of an amorphous substance over a broad temperature range. The resistivity data are then plotted as a function of temperature. If a glass transition occurs over the measured temperature range, the resistivity versus temperature plot will exhibit a rather sharp change of slope. The temperature at which this change of slope occurs is known as the glass transition (or heat distortion) temperature.

Both of the above-described methods are disadvantageous in that they fail to give information on the pressure dependence of the glass transition temperature.

Accordingly, it is an object of this invention to provide a new and improved method for determining the relationship between glass transition temperature and pressure of amorphous substances.

It is another object of this invention to provide a new and improved method for determining the glass transition temperature of amorphous substances at one atmosphere.

It is a further object to provide a new method for determining the relationship between glass transition temperature and pressure for amorphous polymers.

These and other objects of the invention will become more readily apparent from reading the following detailed description of the invention wherein.

Figure 1:
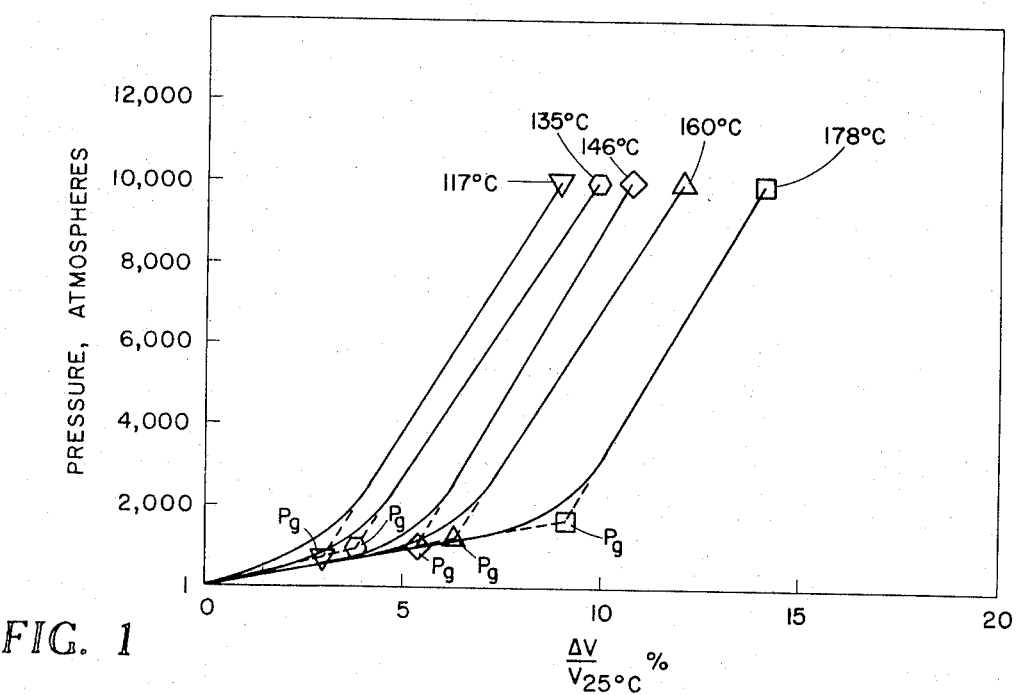
FIG. 1 is a graph showing the relationship between pressure and compressibility for polystyrene at various temperatures.

The objects of this invention are accomplished by first determining the change in volume of a given sample at a constant temperature, when subjected to changing pressures that range from about 1 to 10,000 atmospheres. These determinations are made at about ten different isotherms (ranging from about 25° to 200° C.) and a graph is prepared which plots the relationship between pressure and compressibility ($\Delta V/V_{25° C.}$) at each isotherm. At isotherms above the glass transition temperature, the glass transition pressure ($P_g$) (the pressure at which the sample changes from a rubbery to a glassy solid) is indicated by a change in slope (inflection point) which is caused by the pressure compressibility relationship becoming characteristic of the glassy solid. For some samples the change from a rubbery to a glassy solid (change in slope of the isotherm) occurs over a narrow pressure range and for such samples the glass transition pressure ($P_g$) at each isotherm is determined by extrapolation. (Note FIG. 1.)

The data contained in the first graph is used in preparing a second graph which plots the glass transition pressure ($P_g$) at each isotherm against the temperature at which the isotherm was run. This plot approximates a straight line which indicates the particular temperature and pressure at which a phase change occurs (glassy to rubbery solid) and thus represents the pressure dependency of the glass transition temperature. If it is extrapolated to the one atmosphere ordinate it will indicate the glass transition temperature at this pressure.

The aforementioned plots may be prepared for any amorphous substance and from such plots the glass transition temperature at any given pressure may be readily determined. This invention is particularly applicable to amorphous polymers, from among which there may be mentioned the polyesters; the polymers of unsaturated acid ester such as methyl methacrylate and the like; of unsaturated hydrocarbons such as polystyrene and the like; of unsaturated halogenated hydrocarbons such as polyvinyl chloride and the like; etc. The method of the invention is also operable on crosslinked polymers as for example an epoxy resin formed from diglycidyl ether and bisphenol A and crosslinked with tris(dimethylaminomethyl) phenol tri(2-ethyl hexoate). It is to be understood, however, that the above examples are only illustrative of the wide variety of amorphous substances and in particular amorphous polymers, to which the invention may be applied and they are not to be construed as limiting the scope of the invention.

The following examples illustrate a specific embodiment of the invention but its scope is not to be limited thereby.

EXAMPLE I

The compressibility tester is essentially the same as that employed by Matsuoka and Maxwell, Journal of Polymer Science, vol. 32, page 131 (1958). Two electric heating bands are placed around the tester and the temperature is controlled by manually controlling the input voltage to the heating bands by means of a "Variac." If the voltage is carefully controlled, the temperature of the specimen can be maintained isothermally within ±1° C.

The amorphous specimens used are machined rods, three inches (7.62 cm.) long and 0.250 inch (0.635 cm.) in diameter and they are placed in a cylindrical cavity of the tester where they fit tightly but are still able to move smoothly.

The compressiblity tester is placed on the fixed platen of a Baldwin-Southwark, 60,000 pounds capacity, universal testing machine and the specimen is brought to the desired temperature by adjusting the "Variac." The loading head of the test machine is brought down so as to just touch the upper plunger of the tester and the load is applied at the rate of 0.10 inch per minute. The isothermal relationships between stress and strain are obtained from an automatic recorder and they are identical to the pressure versus compressibility ($\Delta V/V_{25° C.}$) plots used in the invention.

Figure 2:
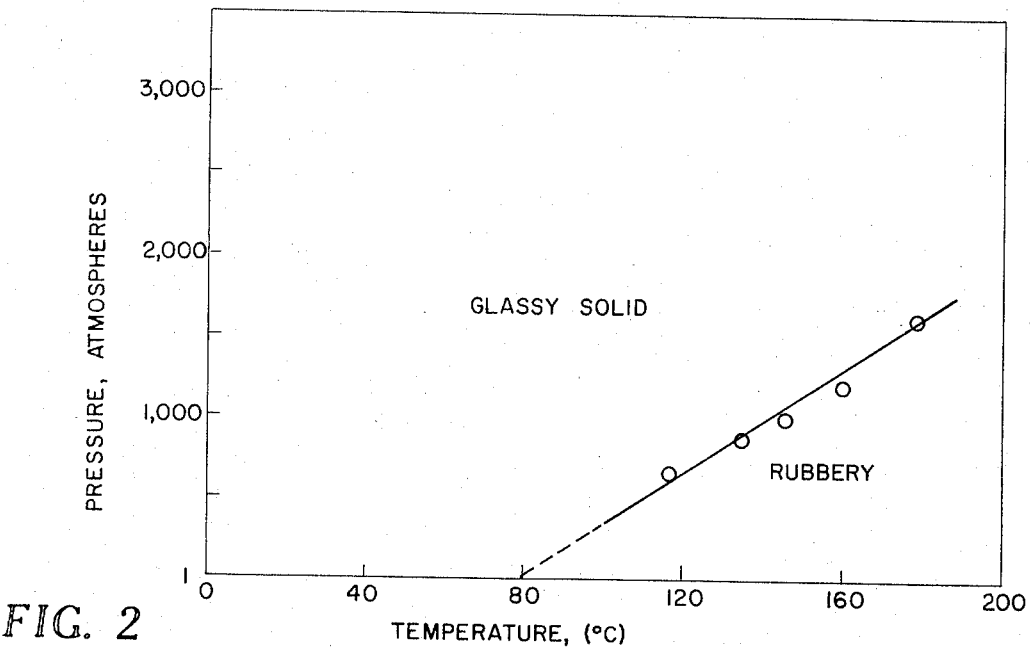
FIG. 2 is a graph showing the variation of the glass transition temperature of polystyrene with pressure.

By the aforementioned procedure the relationship between pressure and compressibility at various isotherms was determined for polystyrene and the results are plotted in the graph of FIG. 1. A second graph was prepared plotting the pressure at which the slope of each isotherm of FIG. 1 changes against the temperature at which the isotherm was run and it is shown in FIG. 2. The graph of FIG. 2 indicates the relationship between pressure and glass transition temperature for polystyrene and its extrapolation to the one atmosphere ordinate indicates the glass transition temperature (78° C.) at this pressure which compares favorably to the temperature of 81° C. as determined by other methods.

EXAMPLE II

Figure 3:
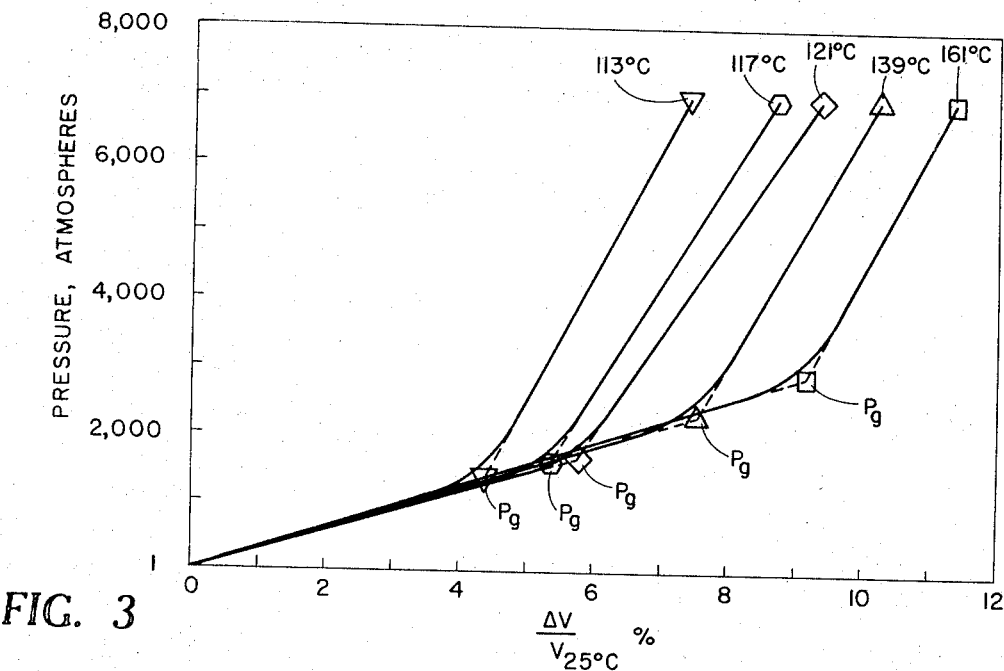
FIG. 3 is a graph showing the relationship between pressure and compressibility of Epon 828 hardened with Hardener D at various temperatures.
Figure 4:
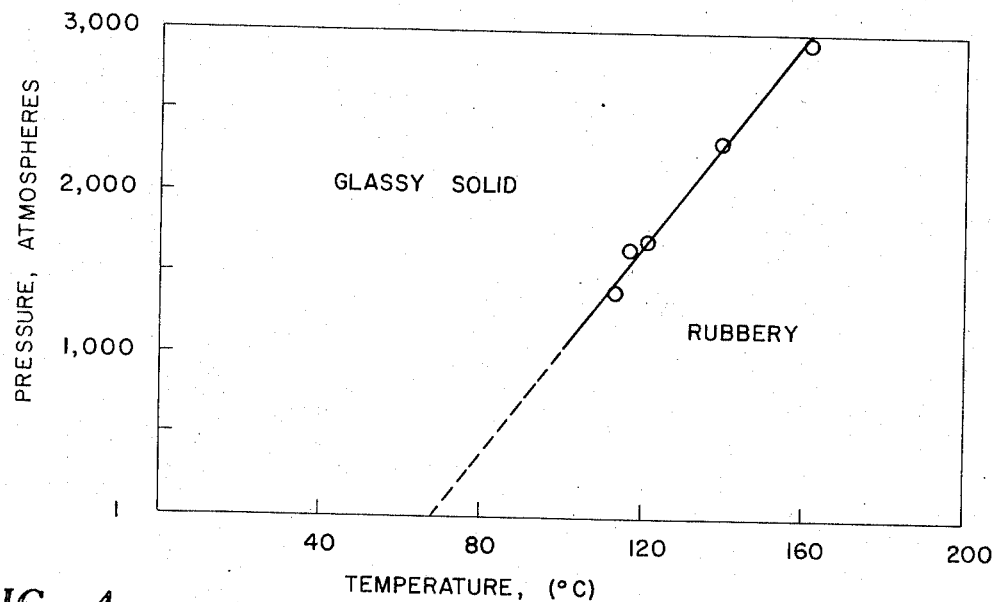
FIG. 4 is a graph showing the variation of the glass transition temperature of Epon 828 hardened with Hardener D with pressure.

The procedure of Example I was repeated with a sample of Epon 828 (an epoxy resin of the Shell Chemical Company which is formed from diglycidyl ether and bisphenol A which has an epoxide equivalent within the range of 185 to 205) which was cured with 13% of Hardener D, a curing agent of the Shell Chemical Company comprising tris(dimethylaminomethyl)phenol tri(2-ethyl hexoate). The compressibility determinations for this example were made at a load rate of 0.025" per minute. The relationship between compressibility and pressure at various isotherms is shown in FIG. 3 and the samples glass transition temperature dependency on pressure is shown in the graph of FIG. 4. This graph indicates that the glass transition temperature at one atmosphere is 68° C. which is in excellent agreement with published values.

It has recently been determined that an improved polymerization product may be obtained by conducting the polymerization above the glass transition temperature of the completely polymerized solid polymer and thus there are many technological applications for this invention. Although the prior art reports the glass transition temperatures for many polymers at atmospheric pressure, the glass transition temperatures at the elevated pressures at which many polymerizations are conducted are not known, and thus the optimum polymerization temperature is also not known. The method of this invention obviates this problem since the transition temperature at any pressure may be readily determined.

Obviously many modifications and variations of the present invention are possible in the light of the above teachings. It is therefore to be understood, that within the scope of the appended claims, the invention may be practiced otherwise than as specifically described.

What is claimed is:
1. A method for determining for an amorphous substance the relationship between glass transition temperature and pressure which comprises;
   (a) subjecting said substance to pressure variations at a plurality of constant temperatures until said substance undergoes an abrupt change in volume,
   (b) measuring the change in volume of said substance for each change in pressure at each constant temperature;
   (c) plotting from the data obtained in (a) and (b) the relationship between pressure and compressibility of said substance at each of said constant temperatures to obtain an isothermal relationship between said pressure and compressibility; and
   (d) plotting the pressure at which the slope of each isotherm of (c) changes against the temperature at which the isotherm was run to obtain a relationship between glass transition temperature and pressure.

2. The method of claim 1 wherein the pressure variations of (a) range from about 1 to 10,000 atmospheres.

3. The method of claim 2 wherein said pressure variations of (a) are measured at constant temperatures that range from about 25° to 200° C.

4. The method of claim 1 wherein said amorphous substance is a polymer.

5. The process of claim 4 wherein said polymer is polystyrene.

6. A method for determining the glass transition temperature of an amorphous substance which comprises:
   (a) subjecting said substance to pressure variations at a plurality of constant temperatures until said substance undergoes an abrupt change in volume; and
   (b) measuring the change in volume of said substance for each change in pressure at each constant temperature, whereby the abrupt change in the rate of change of volume with respect to pressure in each of the pressure variations at constant temperature may be used to calculate the glass transition temperature at a given pressure.

References Cited

UNITED STATES PATENTS 1,699,589    1/1929    Hirsch et al. _____ 73—94

OTHER REFERENCES

Reitzel, J., Simon, I., and Walker, J. A.: New Method for Measuring Linear Compressibility of Solids, The Review of Scientific Instruments, 28(10), pp. 828–829, October 1957.

RICHARD C. QUEISSER, *Primary Examiner.*

JAMES GILL, *Examiner.*

J. R. FLANAGAN, *Assistant Examiner.*